United States Patent
Barsness et al.

(10) Patent No.: US 10,169,197 B2
(45) Date of Patent: *Jan. 1, 2019

(54) TEMPORARY BREAKPOINTS DURING DEBUG PROCESS

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/413,506

(22) Filed: Jan. 24, 2017

(65) Prior Publication Data

US 2018/0210813 A1 Jul. 26, 2018

(51) Int. Cl.
*G06F 9/44* (2018.01)
*G06F 11/36* (2006.01)

(52) U.S. Cl.
CPC ...... *G06F 11/3636* (2013.01); *G06F 11/3612* (2013.01); *G06F 11/3632* (2013.01)

(58) Field of Classification Search
CPC .................. G06F 11/3636; G06F 11/3632
USPC .................. 717/123–130, 140–141
See application file for complete search history.

(56) References Cited

U.S. PATENT DOCUMENTS

| | | | | |
|---|---|---|---|---|
| 5,794,047 A | * | 8/1998 | Meier | G06F 9/547 709/203 |
| 6,721,941 B1 | * | 4/2004 | Morshed | G06F 11/3612 709/217 |
| 6,826,746 B2 | * | 11/2004 | Evans | G06F 11/362 714/E11.21 |
| 6,957,421 B2 | | 10/2005 | Hundt et al. | |
| 7,133,820 B2 | * | 11/2006 | Pennello | G06F 11/3636 703/22 |
| 7,191,433 B2 | * | 3/2007 | Narad | H04L 45/16 717/140 |

(Continued)

OTHER PUBLICATIONS

Iqbal et al, "Understanding and Developing Models for Detecting and Differentiating Breakpoints during Interactive Tasks", ACM, pp. 697-706, 2007.*

(Continued)

*Primary Examiner* — Anil Khatri
(74) *Attorney, Agent, or Firm* — Patterson + Sheridan, LLP (57) ABSTRACT

A method for debugging an executable is disclosed herein. The method begins by receiving one or more breakpoints related to a call stack in the executable. The processor receives an executable in a debug environment. The processor executes an executable until one or more breakpoints are hit. Upon detecting a breakpoint, the processor temporarily halts executing by transferring control to an analysis tool to gather information related to execution of the executable up to the breakpoint. The analysis tool gathers one or more predefined outliers. The processor receives control back from the analysis tool to continue execution in response to the analysis tool collecting relevant information in the executable.

14 Claims, 5 Drawing Sheets

(56) References Cited

U.S. PATENT DOCUMENTS

| | | | | |
|---|---|---|---|---|
| 7,343,588 B2* | 3/2008 | Bates | ................... | G06F 11/362 |
| | | | | 714/E11.207 |
| 7,367,023 B2* | 4/2008 | Adolphson | ........... | G06F 8/4434 |
| | | | | 717/142 |
| 7,401,323 B2* | 7/2008 | Stall | ................... | G06F 11/3624 |
| | | | | 714/E11.209 |
| 7,882,492 B2* | 2/2011 | Viswanadha | ....... | G06F 11/3664 |
| | | | | 717/124 |
| 8,291,381 B2* | 10/2012 | Lai | ........................ | G06F 9/4484 |
| | | | | 717/124 |
| 8,301,868 B2* | 10/2012 | Newburn | .............. | G06F 11/348 |
| | | | | 712/220 |
| 8,336,032 B2 | 12/2012 | Bates | | |
| 8,552,213 B2 | 10/2013 | Watanabe et al. | | |
| 8,756,570 B2* | 6/2014 | Wegmann | ........... | G06F 11/3664 |
| | | | | 717/124 |
| 8,769,502 B2* | 7/2014 | Heidasch | ................ | G06F 11/36 |
| | | | | 717/124 |
| 8,856,742 B2* | 10/2014 | Branda | ............... | G06F 11/3664 |
| | | | | 717/124 |
| 9,135,147 B2 | 9/2015 | Artzi et al. | | |
| 9,916,232 B2* | 3/2018 | Voccio | ................ | G06F 11/3612 |
| 2011/0107307 A1 | 5/2011 | Liu et al. | | |

OTHER PUBLICATIONS

Zhang et al, "BPGen: An Automated Breakpoint Generator for Debugging", ACM, pp. 271-274, 2010.*
Yin et al, "A Pointcut Language for Setting Advanced Breakpoints", ACM, pp. 145-156, 2013.*
Chen et al, "Software Design and Implementation of Data Breakpoint in Embedded System", IEEE, pp. 1726-1729, 2012 (Year: 2012) (Year: 2012).*
Thane et al, "Replay Debugging of Real-Time Systems Using Time Machines", IEEE, pp. 1-8, 2003 (Year: 2003) (Year: 2003).*
Barton et al, "Dynamic and Graphical Web Page Breakpoints", ACM, pp. 81-90, 2010 (Year: 2010) (Year: 2010).*
Koch et al, "Breakpoints and Breakpoint Detection in Source Level Emulation", IEEE, pp. 26-31, 1996 (Year: 1996) (Year: 1996).*
"Method for Source Code Debugging Using the Program Call Stack for Conditional Points," IBM, IP.com Prior Art Database Technical Disclosure, No. IPCOM000179911D, Mar. 2, 2009, 3 pages.

* cited by examiner

TEMPORARY BREAKPOINTS DURING DEBUG PROCESS

BACKGROUND

The present disclosure generally relates to debugging an executable at runtime, and more specifically to, temporarily halting debugging of the executable.

An issue in developing software is that the quality of code is dependent on many factors, such as the skill level of the developers, the quality of testing, and the sufficient time to test every path of code. In today's competitive market, the time to design, generate, and test code is constantly shrinking, while the time to fix problems within the code is becoming increasingly more critical. There is a need to provide better tools for developers to help speed the diagnostic process and help developers become more proactive at looking for potential problem areas before issues arise in the field.

Sometimes debugging code, especially in a distributed programming environment can be quite challenging. Often times, depending upon the system in which the code is being deployed, the user may not have direct access to the machines as the deployment is performed by an intermediary job submission process. Furthermore, in some cases, the user does not want to stop execution of the code to examine various variables and the like, but rather, would like to gather information necessary to determine issues in the code at a later point in time.

SUMMARY

Embodiments described herein provide a method, system, and computer readable medium configured to debug an executable. The method begins by receiving one or more breakpoints related to a call stack in the executable. The processor receives an executable in a debug environment. The processor executes an executable until one or more breakpoints are hit. Upon detecting a breakpoint, the processor temporarily halts executing by transferring control to an analysis tool to gather information related to execution of the executable up to the breakpoint. The analysis tool gathers one or more predefined outliers. The processor receives control back from the analysis tool to continue execution in response to the analysis tool collecting relevant information in the executable.

DETAILED DESCRIPTION

Embodiments described herein provide a method, system, and computer readable medium configured to debug an executable. The method begins by receiving one or more breakpoints related to a call stack in the executable. The processor receives an executable in a debug environment. The processor executes an executable until one or more breakpoints are hit. Upon detecting a breakpoint, the processor temporarily halts executing by transferring control to an analysis tool. The processor receives control back from the analysis tool to continue execution in response to the analysis tool collecting relevant information in the executable.

Figure 1:
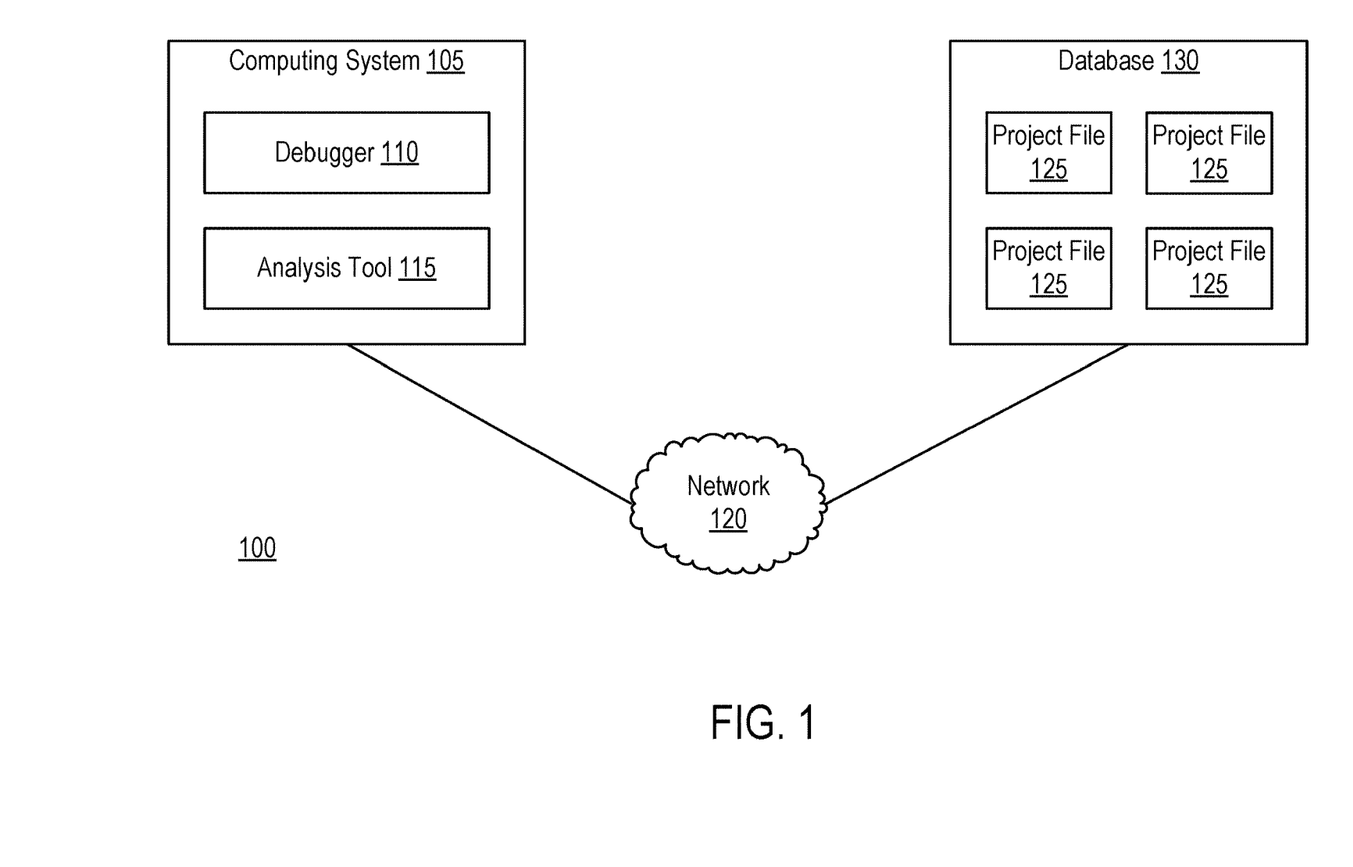
FIG. 1 illustrates a computing environment, according to one embodiment described herein.

FIG. 1 illustrates an example computing environment 100, according to one embodiment. For example, the computing environment 100 includes a computing system 105, a network 120, and a database 130 for storing one or more project files 125. Illustratively, the computing system 105 includes a debugger 110 and an analysis tool 115.

The debugger 110 is an application generally configured to test and/or debug other executables, such as one of the project files 125 in database 130. The debugger 110 allows the developer to diagnose and correct problems that occur during runtime. For example, a developer can user the debugger 110 to insert breakpoints at location in a program where the program crashes or where the program does not produce the correct results.

The analysis tool 115 is an application that may be launched by the debugger when a breakpoint is hit. The analysis tool 115 is configured to gather relevant information relating to errors and problems identified during runtime of the executable up to the breakpoint. For example, the analysis tool 115 may gather information related to memory errors, such as uninitialized memory access, buffer overflow, and improper freeing of memory. The analysis tool 115 may also gather information related to system type, software levels, PTF levels, CPU speeds, memory size, and the like. Such information aids in narrowing down problems where a problem is only seen on a certain machine type configuration.

In the computing environment 100, the analysis tool 115 works with the debugger to assist developers in zeroing in on potential issues that may be causing a problem the developer is trying to debug, with only a "semi" break in execution. When a breakpoint is reached by the debugger, control is passed to an exit program that launches the analysis tool 115 to go and gather relevant information that would aid the programmer in understanding the issues.

Figure 2:
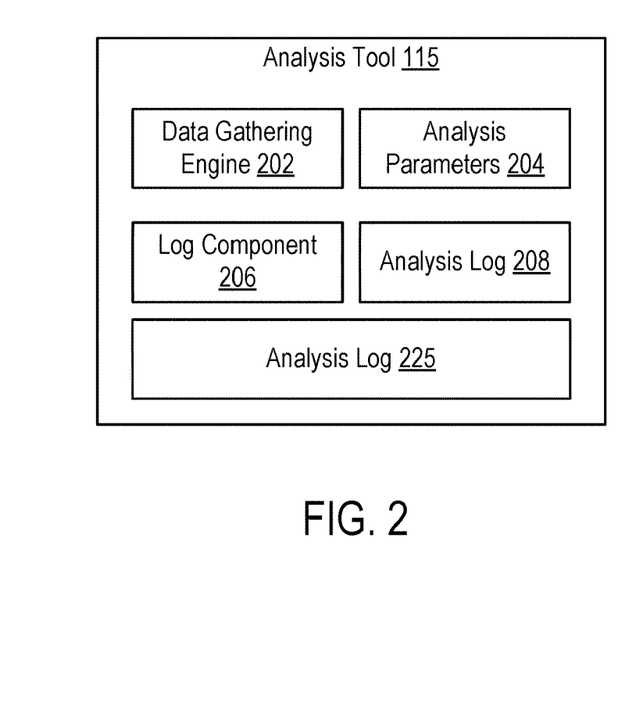
FIG. 2 illustrates the analysis tool of FIG. 1, according to one embodiment disclosed herein.

FIG. 2 illustrates the analysis tool 115, according to one embodiment. As shown, the analysis tool 115 includes a data gathering engine 202, analysis parameters 204, an analysis log component 206, and an analysis log 208. The analysis parameters 204 include one or more parameters to be gathered by the analysis tool 115 when triggered by the exit program. For example, the analysis parameters 204 may include one or more variables, such as CPU speeds, memory size, memory errors, and the like as relevant information to be gathered. The analysis parameters 204 may also include one or more standard deviation values. The one or more standard deviation values may be used to identify one or more "outliers" in the gathered information. The outliers may be defined as those errors that exceed the standard deviation value. Errors that exceed the standard deviation error may be exceptional errors that the programmer may be specifically interested in. Additionally, the programmer may set the analysis parameters 204 such that the analysis tool 115 gathers only such outliers. In another embodiment, analysis parameters 204 may be set to identify one or more outliers by looking to see which numeric are not 0, or which strings are not nulls. In yet another embodiment, the programmer may set the analysis parameters 204 such that analysis tool 115 only analyzes data structures, i.e., a list of hashable entities.

The data gathering engine 202 gathers the relevant information related to the execution of the program file up to the breakpoint. For example, the data gathering engine 202 gathers information as specified in the analysis parameters 204. For example, the data gathering engine 202 may be configured to only gather information related to buffer overflows or the improper freeing of memory. In another embodiment, the data gathering engine 202 may be configured to only gather information related to CPU speeds that exceeds a pre-set standard deviation value. The analysis log component 206 logs the information gathered by the data gathering engine 202 in the analysis log 225 to be transmitted to the debugger.

Figure 3:
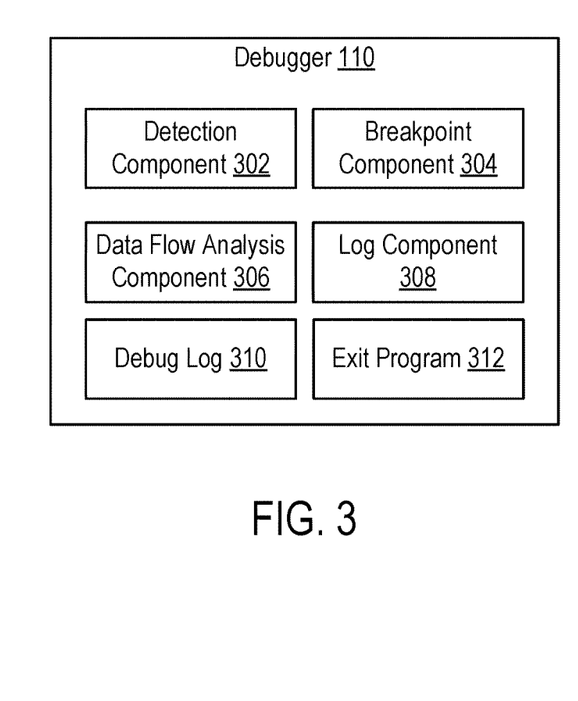
FIG. 3 illustrates the debugger of FIG. 1, according to one embodiment disclosed herein.

FIG. 3 illustrates the debugger 110, according to one embodiment. As shown, the debugger 110 includes a detection component 302, a breakpoint component 304, a data flow analysis component 306, a log component 308, a debug log 310, and an exit program 312. The detection component 302 receives the data gathered by the data gathering engine 202 of the analysis tool 115. The log component 308 records the errors found by the data gathering engine 202 in the debug log 310 for the currently executing routine. The breakpoint component 304 allows the user to set breakpoints for the detection component 302, such that the exit program 312 is triggered. The exit program 312 transfers control from the debugger 110 to the analysis tool 115 such that the relevant information may be gathered. For example, the when a first breakpoint is hit, the exit program 312 is triggered, thus transferring control from the debugger 110 to the analysis tool 115. Once the analysis tool 115 gathers the relevant information, control is transferred back to the debugger 110 such that execution may continue until any remaining breakpoints are hit.

Alternatively, in some embodiments, the debugger 110 may include the analysis tool 115. Thus, rather than the exit program 312 transferring control from the debugger 110 to the analysis tool 115 upon detection of a breakpoint, the exit program can transfer control within the debugger 110 from the detection component 302 to the data gathering engine 202 in the analysis tool 115. As such, a single mechanism may be implemented in which execution may be temporarily paused while the relevant information is gathered.

Figure 4:
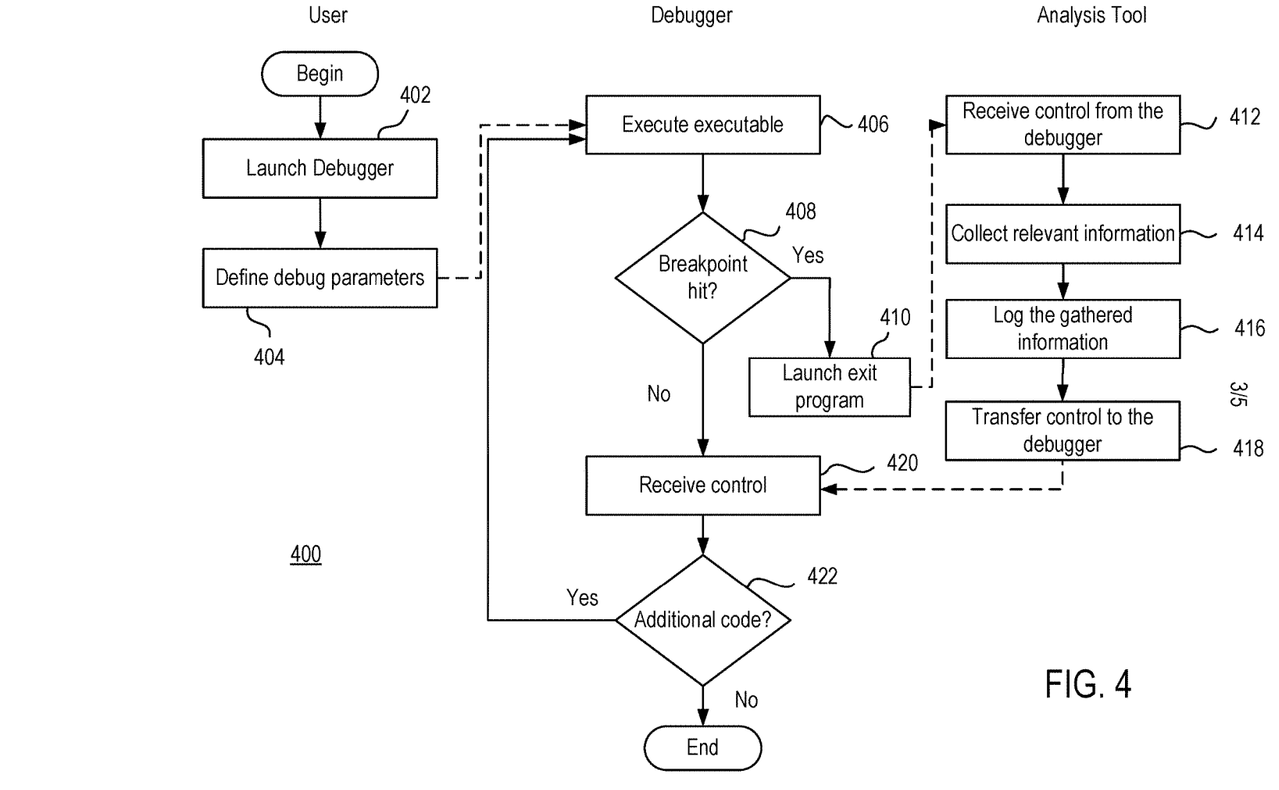
FIG. 4 illustrates a method of debugging a program, according to one embodiment disclosed herein.

FIG. 4 illustrates a method 400 of debugging a program, according to one embodiment. At step 402, the debugger 110 is launched. At step 404, the debug parameters are defined in the debugger. For example, a programmer or developer may use the breakpoint components 304 provided by the debugger to specify breakpoints at which the execution of the executable should be temporarily paused. Such breakpoints can be unconditional or depend on a set of conditions (e.g., halt on reaching an instruction if a given variable has a specified value).

At step 406, the executable runs in the debugger. The executable runs in the debugger until a breakpoint is hit. At step 408, the debugger determines whether a breakpoint is hit. If a breakpoint is hit, then at step 410 the debugger launches an exit program. For example, the debugger may launch exit program 312. Launching the exit program 312 allows for control to be passed from the debugger 110 to the analysis tool 115. As control is passed from the debugger 110 to the analysis tool 115 the execution of the executable is temporarily halted until control is returned from the analysis tool 115 to the debugger 110.

At step 412, the analysis tool 115 receives control from the debugger 110. At step 414, the analysis tool 115 collects the relevant information defined by the programmer or developer. For example, at step 414, which may be performed prior to executing the executable in the debugger or before gathering information using the analysis tool, the analysis tool 115 may receive one or more analysis parameters 204 from the developer. The analysis parameters 204 include one or more parameters to be gathered by the analysis tool 115 when triggered by the exit program. For example, the analysis parameters 204 may include one or more variables, such as CPU speeds, memory size, memory errors, and the like as relevant information to be gathered. The analysis parameters 204 may also include one or more standard deviation values. The one or more standard deviation values may be used to identify one or more "outliers" in the gathered information. At step 416, the analysis tool 115 logs the gathered information in the analysis log 208 to be accessed by the programmer or developer. The analysis tool 115 then transfers control back to the debugger 110 (step 418).

The debugger 110 receives control back from the analysis tool 115, and automatically continues to execute the executable in the debug environment (step 420). At step 422, the debugger 110 determines whether there is additional code in the executable to run. If there is additional code in the executable, the method 400 reverts to step 406 for continued execution. If, however, there is no remaining code, then the method 400 ends.

Figure 5:
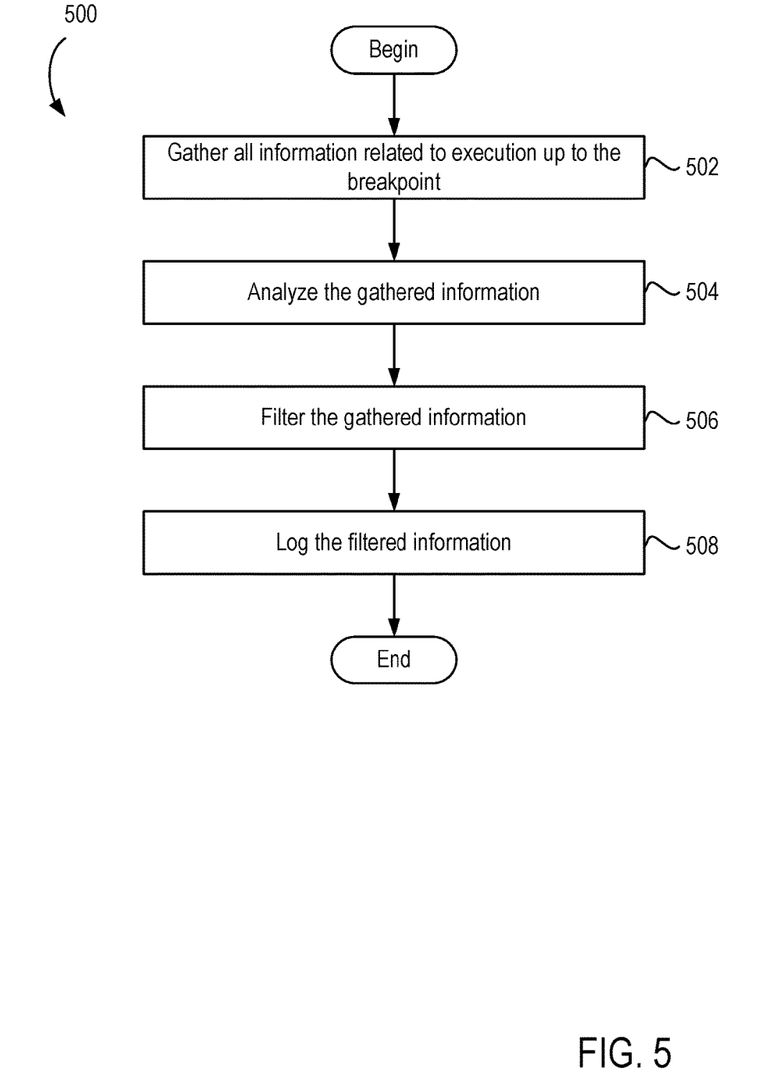
FIG. 5 illustrates a sub-step of the method of FIG. 4, according to one embodiment disclosed herein.

FIG. 5 is a flow chart 500 illustrating step 414 in greater detail, according to one embodiment. At step 502, the analysis tool 115 gathers all information related to the execution of the executable up to the breakpoint. For example, in the case that there are multiple break points, BP1, BP2, and BP3 set in the executable, the analysis tool 115 may gather information up to BP1, between BP2 and BP3, and after BP3 to the end of the executable. At step 504, the analysis tool 115 analyzes the gathered information. For example, the analysis tool 115 may filter the gathered information such that the analysis tool 115 only logs that information requested by the programmer or developer in the analysis parameters 204. This allows the analysis tool 115 to return only streamlined information to the programmer or developer.

At step 506, the analysis tool 115 may optionally further filter the gathered information. For example, at step 506 the analysis tool 115 determines if any "outliers" are found. An outlier may be defined as some value that is exceptional to some value. For example, the analysis parameters 204 may contain one or more standard deviation values for one or more parameters. If the analysis tool 115 determines that a value for a given parameter exceeds its standard deviation value, the analysis tool 115 may mark that variable as an outlier. The standard deviation analysis would be performed when the analysis tool 115 knows that a variable should have a value that lies in a normal distribution. For example, assume input is in the form of temperature from a temperature sensor that usually provides values between 65 and 75 degrees. A user would want to break when input received is some number of deviations from the mean of the 65-75 degrees distribution. In other examples where the distribution characteristics are unknown, the analysis tool may access historic information about the received value at the breakpoint to determine the distribution characteristics, and thus determine whether the specified deviation is exceeded.

In another embodiment, analysis parameters 204 may be set to identify one or more outliers by looking to see which numeric are not 0, or which strings are not nulls. In this embodiment, the user specifies what the normal and abnormal values are. For example, if 0 or null is indicated as being abnormal, the debugger would break when 0 or null is encountered. The analysis tool 115 can also access historical data to determine what are abnormal values (e.g., values never having occurred before or below some specified frequency). In some examples, the analysis tool 115 could also learn during the debugging process by breaking on each new value encountered and allowing the user to indicate whether the value is normal or abnormal. The analysis tool 115 can then use this information in subsequent analyses.

In yet another embodiment, the programmer may set the analysis parameters 204 such that analysis tool 115 only analyzes data structures, i.e., a list of hashable entities. For example, the user may not care what values are in the dictionary, but instead, what keys are (or are not) in the dictionary. More generally, the contents of any dynamic data structure or object. For example, assume an incoming request may be provided as a JSON string which is turned into a dictionary. The user may wish to break when the dictionary contains (or does not contain) one or more specified optional parameters. Each of these embodiments may be performed separately or combined.

At step 508, the analysis tool 115 logs all filtered information from the total gathered information. The filtered information is what will be provided to, or accessed by, the developer or programmer. The analysis tool 115 then transfers control back to debugger 110 for further execution.

As described, the use of the analysis tool 115 in conjunction with the debugger 110 allows for the implementation of breakpoints, similar to conventional breakpoints, without requiring additional feedback from the programmer or developer to restart execution after the breakpoint is reached. As such, the debugger 110 may provide the programmer or developer with logs of information related to the execution of the executable without requiring the programmer or developer to manually watch the execution. As such, the programmer or developer gains a greater efficiency without having to manually write boilerplate debug code every time.

In another embodiment, the methods discussed in FIGS. 4 and 5 may be performed by a single debugger 110 having an analysis tool contained therein. As such, the exit program, instead of transferring control debugger 110 and the analysis tool 115, will transfer control within the debugger 110 to a data gathering engine similar to data gathering engine 202.

Figure 6:
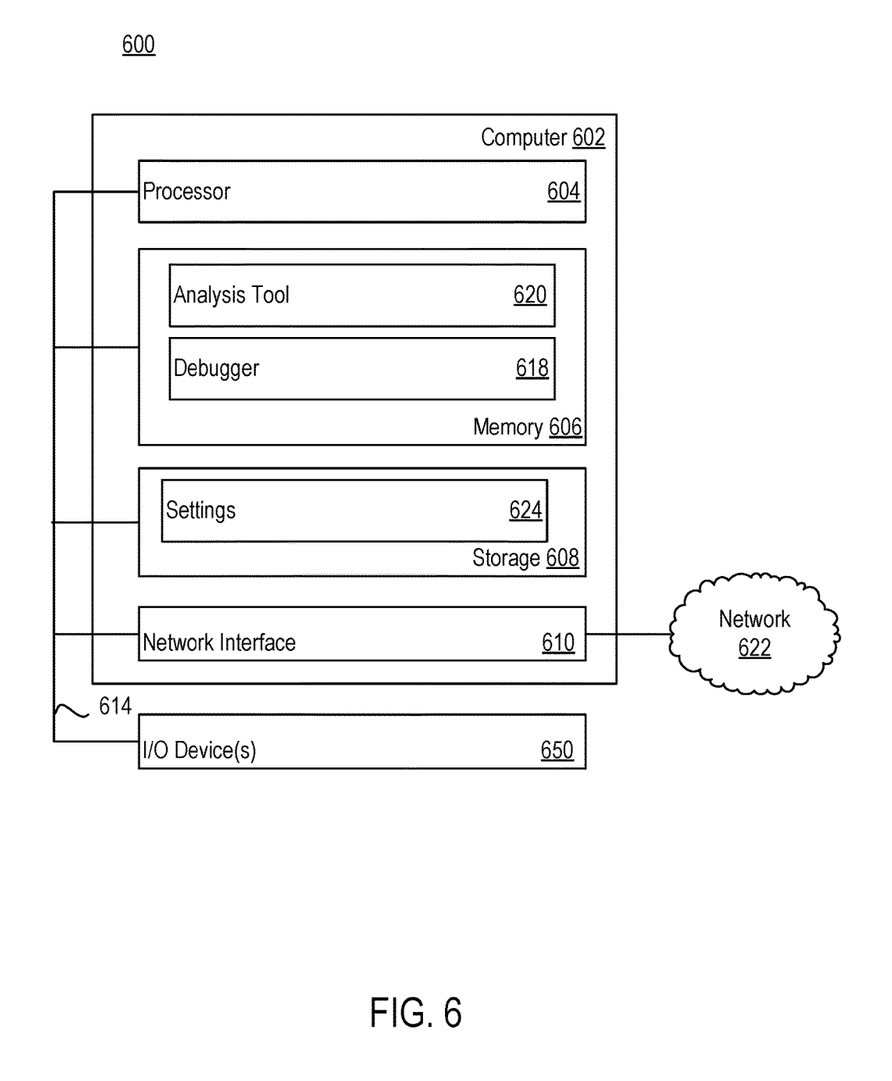
FIG. 6 illustrates an example computing system, according to one embodiment disclosed herein

FIG. 6 illustrates an example computing system 600, according to one embodiment. As shown, the computing system 600 includes a computer 602 having a central processing unit (CPU) 604, a memory 606, storage 608, and a network interface 610, each connected to a bus 614. The computing system 600 may be in communication with one or more I/O device(s) 650. Note, CPU 604 is included to be representative of a single CPU, multiple CPUs, a single CPU having multiple processing cores, and the like. The memory 606 is generally included to be representative of a random access memory. The storage 608 may be a disk drive storage device. Although shown as a single unit, the storage 608 may be a combination of a fixed and/or removable storage, such as fixed disc drives, removable memory cards, optical storage, network attached storage (NAS), or storage-area-network (SAN). The storage 608 may include settings 624. The network interface 610 may be any type of network communications allowing the computing system 600 to communicate with other computers via the network 622.

The memory 606 further includes a debugger 618 and an analysis tool 620. The debugger 618 is an application generally configured to rets and/or debug other executables. The debugger 618 allows the developer to pinpoint anomalies that occur during runtime. For example, the debugger 618 can insert breakpoints at instances where a given processing element crashes, sends data to an unintended target processing element, etc.

The analysis tool 620 is an application that may be launched by the debugger 618 when a breakpoint is hit. The analysis tool 620 is configured to gather relevant information relating to errors and problems identified during runtime of the executable up to the breakpoint. For example, the analysis tool 620 may gather information related to memory errors, such as uninitialized memory access, buffer overflow, and improper freeing of memory. The analysis tool 620 may also gather information related to system type, software levels, PTF levels, CPU speeds, memory size, and the like. Such information aids in narrowing down problems where a problem is only seen on a certain machine type configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A method of debugging an executable, comprising:
   receiving one or more breakpoints related to a call stack in the executable;
   receiving an executable in a debug environment;
   executing the executable until one or more breakpoints are hit;
   upon detecting a breakpoint, temporarily halting executing comprising transferring control to an analysis tool within the debug environment to gather information related to execution of the executable up to the breakpoint,
   wherein the analysis tool performs an operation to gather data relating to the execution of the executable without requiring user interaction, the operation comprising:
      gathering information related to execution of the executable of the breakpoint;
      analyzing the information that was gathered;
      identifying one or more outliers within the information, wherein the one or more outliers are identified as one or more data values for one or more parameters within the information that exceed a predefined number of standard deviations for the one or more parameters; and
      automatically logging the identified one or more outliers; and
   receiving control back from the analysis tool to continue execution in response to the analysis tool collecting relevant information in the executable.

2. The method of claim 1, wherein upon detecting a breakpoint, temporarily halting executing by transferring control to an analysis tool comprises:
   launching an exit program configured to transfer control from the debug environment to the analysis tool.

3. The method of claim 1, wherein upon detecting a breakpoint, temporarily halting executing by transferring control to an analysis tool comprises:
   transferring control to the analysis tool within the debug environment.

4. The method of claim 1, wherein filtering the information to determining whether the information includes one or more outliers, comprises:
   determining whether the information includes one or more strings that are not null.

5. The method of claim 1, wherein upon detecting a breakpoint, temporarily halting executing by transferring control to an analysis tool comprises:
   transferring control out of the debug environment to the analysis tool.

6. A system, comprising:
   a computer processor; and
   a memory containing a program that, when executed on the computer processor, performs an operation, comprising:
      receiving one or more breakpoints related to a call stack in the executable;
      receiving an executable in a debug environment;
      executing the executable until one or more breakpoints are hit;
      upon detecting a breakpoint, temporarily halting executing comprising transferring control to an analysis tool within the debug environment to gather information related to execution of the executable up to the breakpoint,
      wherein the analysis tool performs an operation to gather data relating to the execution of the executable without requiring user interaction, the operation comprising:
         gathering information related to execution of the executable of the breakpoint;
         analyzing the information that was gathered;
         identifying one or more outliers within the information, wherein the one or more outliers are identified as one or more data values for one or more parameters within the information that exceed a predefined number of standard deviations for the one or more parameters; and
         automatically logging the identified one or more outliers; and
      receiving control back from the analysis tool to continue execution in response to the analysis tool collecting relevant information in the executable.

7. The system of claim 6, wherein upon detecting a breakpoint, temporarily halting executing by transferring control to an analysis tool comprises:
   launching an exit program configured to transfer control from the debug environment to the analysis tool.

8. The method of claim 6, wherein filtering the information to determining whether the information includes one or more outliers, comprises:
   determining whether the information includes data that exceeds a predefined standard deviation value for one or more parameters.

9. The method of claim 6 wherein filtering the information to determining whether the information includes one or more outliers, comprises:
   determining whether the information includes one or more strings that are not null.

10. The method of claim 6, wherein upon detecting a breakpoint, temporarily halting executing by transferring control to an analysis tool, comprises:
    transferring control out of the debug environment to the analysis tool.

11. A computer program product for analyzing a heap following a core dump, the computer program product comprising:
    a computer-readable storage medium having computer-readable program code embodied therewith, the computer-readable program code executable by one or more computer processors to:
       receive one or more breakpoints related to a call stack in the executable;
       receive an executable in a debug environment;
       execute the executable until one or more breakpoints are hit;
       upon detecting a breakpoint, temporarily halting executing comprising transferring control to an analysis tool within the debug environment to gather information related to execution of the executable up to the breakpoint,
       wherein the analysis tool performs an operation to gather data relating to the execution of the executable without requiring user interaction, the operation comprising:
          gathering information related to execution of the executable of the breakpoint;
          analyzing the information that was gathered;

identifying one or more outliers within the information, wherein the one or more outliers are identified as one or more data values for one or more parameters within the information that exceed a predefined number of standard deviations for the one or more parameters; and automatically logging the identified one or more outliers; and receiving control back from the analysis tool to continue execution in response to the analysis tool collecting relevant information in the executable.

12. The computer program product of claim 11, wherein upon detecting a breakpoint, temporarily halting executing by transferring control to an analysis tool comprises:

launching an exit program configured to transfer control from the debug environment to the analysis tool.

13. The computer program product of claim 11, wherein filtering the information to determining whether the information includes one or more outliers, comprises:

determining whether the information includes data that exceeds a predefined standard deviation value for one or more parameters.

14. The computer program product of claim 11 wherein filtering the information to determining whether the information includes one or more outliers, comprises:

determining whether the information includes one or more strings that are not null.

\* \* \* \* \*